Nov. 4, 1952     T. B. TINKER     2,616,333
FOLDABLE STEREOSCOPIC DEVICE
Filed Feb. 11, 1950     2 SHEETS—SHEET 2
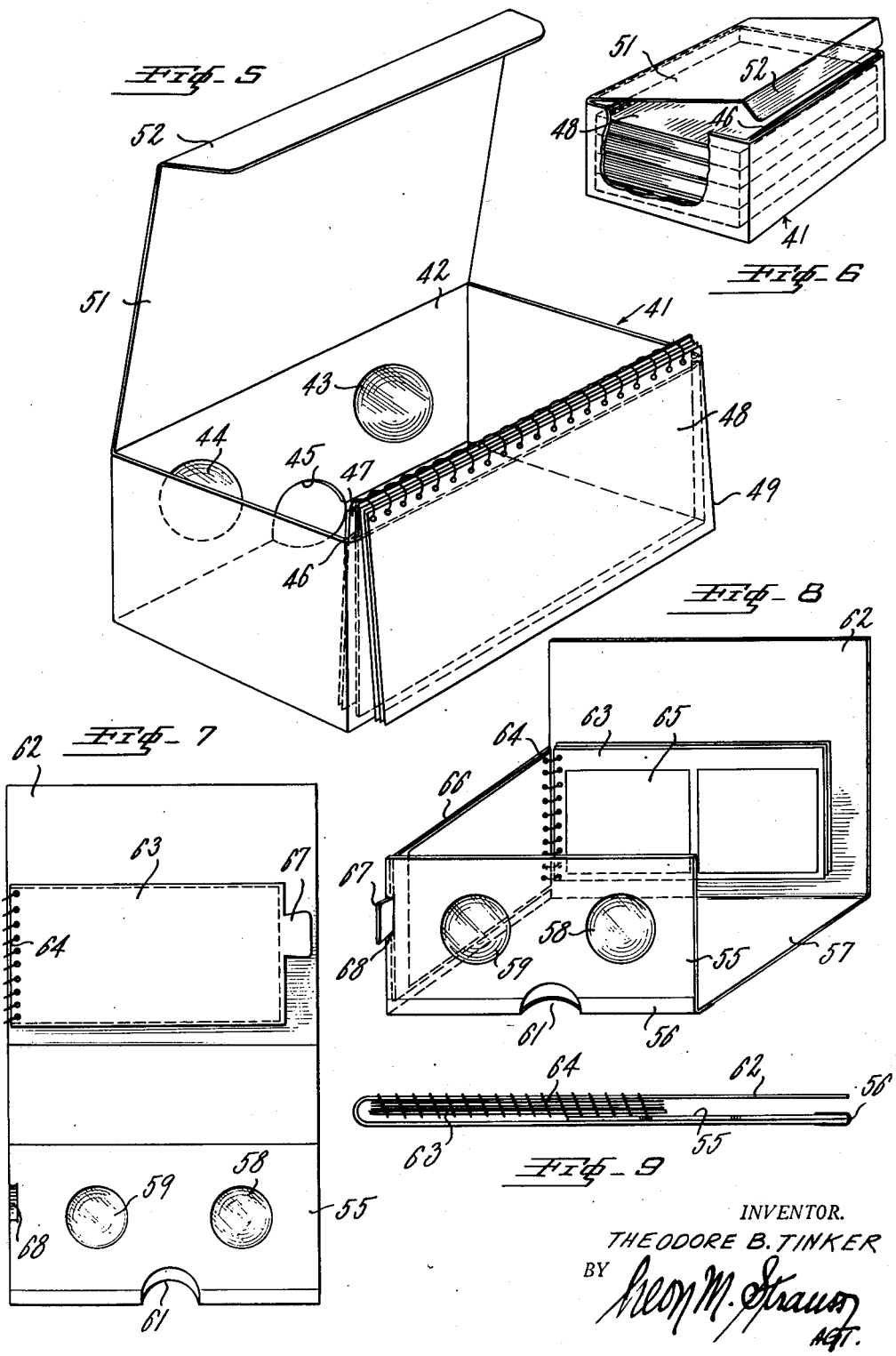
INVENTOR.
THEODORE B. TINKER
BY
Leon M. Strauss
AGT.

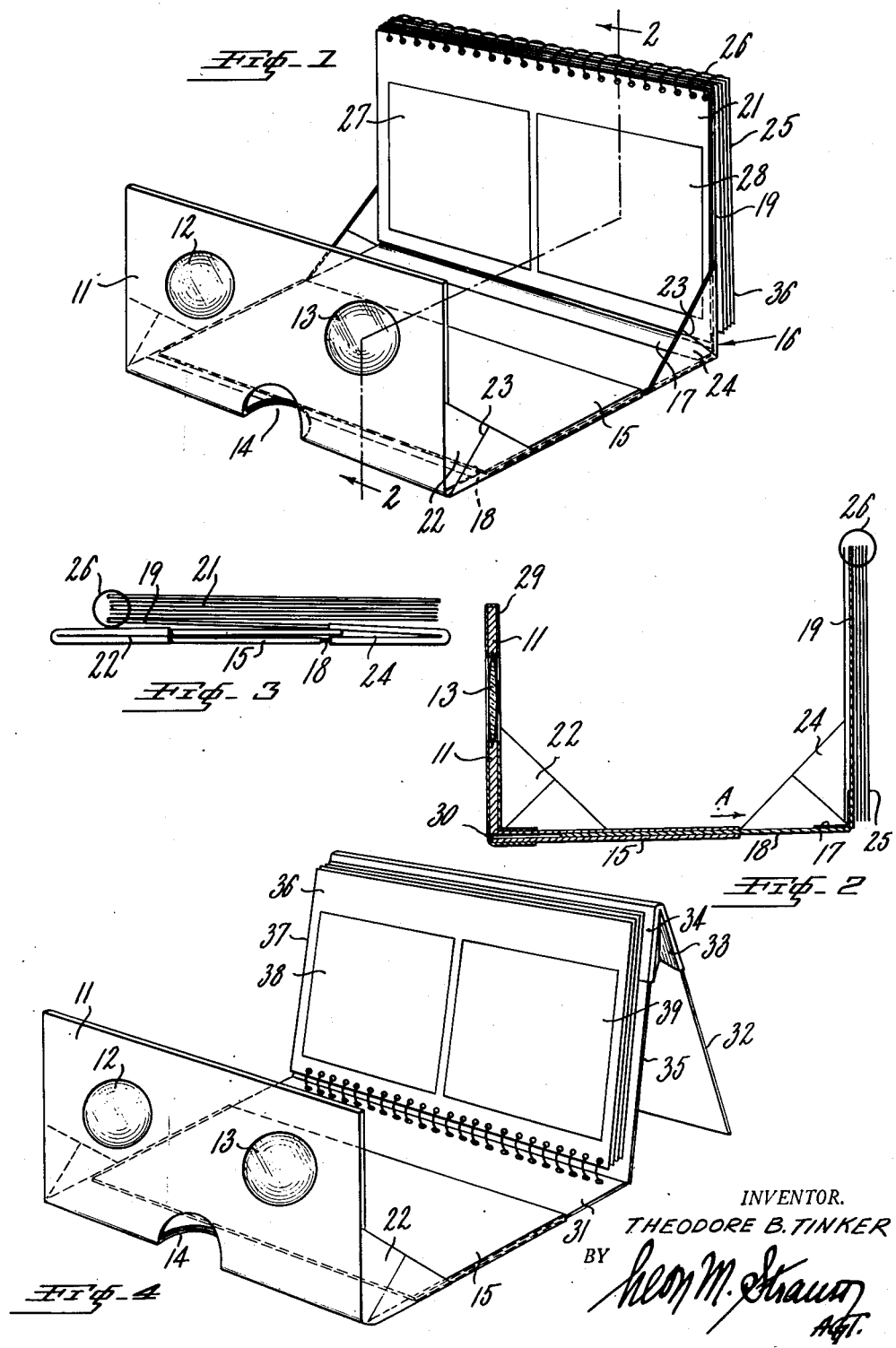

Patented Nov. 4, 1952

2,616,333

UNITED STATES PATENT OFFICE 2,616,333

FOLDABLE STEREOSCOPIC DEVICE

Theodore B. Tinker, New York, N. Y.

Application February 11, 1950, Serial No. 143,744

3 Claims. (Cl. 88—30)

This invention relates to a foldable or collapsible device for use in viewing photographs, portraits, pictures and the like.

It is an object of the present invention to provide means enabling detachable connection of one or more picture cards, preferably bound in book or album form, to a stereoscopic device, the latter including foldable parts adapted to be set up for operation of the device.

It is another object of the present invention to provide means affording support and bracing of the walls of a stereoscopic device in open position, the device being adapted to contain the picture album.

It is another object of the present invention to provide in a foldable stereoscopic device, means facilitating proper centering of the device over the nose of the operator who views the pictures.

It is another object of the present invention to provide in a foldable stereoscopic device an arrangement in the form of a box or container wherein one wall of the same is adapted to receive and support a card or picture album and wherein the cover of the box is adapted to serve as a reflector to illuminate the pictures being viewed.

Other objects of the present invention are to provide a stereoscopic device which is of simple construction, inexpensive to manufacture, quick and easy to assemble, self-contained, compact, has a minimum number of parts, is adapted to releasably support picture albums, affords easy access to the picture albums to pivot and to position the same in front of the lenses of the device, is of pleasing appearance, and efficient in operation.

For other objects and for a better understanding of the invention, reference may be had to the following detailed description taken in connection with the accompanying drawings, in which:

Fig. 1 is a perspective view of a stereoscopic device with the portions thereof extended to view the pictures.

Fig. 2 is a transverse sectional view of the device as viewed on line 2—2 of Fig. 1.

Fig. 3 is an end elevational view of the device with the parts thereof folded together to provide a package and in their collapsed positions.

Fig. 4 is a perspective view of a modified form of the device of Fig. 1 with the parts thereof extended and of a type adapted to be rested upon a horizontal supporting surface as the pictures are viewed.

Fig. 5 is a perspective view of still another form of the device utilizing a box or container with one wall of the same serving to receive the album and the cover serving as a reflector.

Fig. 6 is a perspective view of the form of the invention shown in Fig. 5 on a reduced scale and with several albums stored in the box.

Fig. 7 is a plan view of a still further form of the invention with the parts in their flattened position.

Fig. 8 is a perspective view of the form of the invention shown in Fig. 7 with the parts joined together for viewing operation.

Fig. 9 is a side elevational view of the form of the invention shown in Figs. 7 and 8 with the parts folded upon one another so that the device can be carried.

Referring now particularly to Figs. 1, 2 and 3, 11 represents a lens portion having lenses 12 and 13 therein spaced properly to receive the eyes when the nose is extended into a cut away space 14 lying at the folded bottom edge of the lens portion 11. The lens portion 11 is foldably connected to a jacket or sleeve portion 15 adapted to have a slide fit with a foldable holder 16 formed of two parts hinged together, as indicated at 17, and providing one part 18 slidable into the sleeve portion 15 and the other part serving as a backing support portion 19 for supporting album 21.

Gussets 22 are provided between the lens portions 11 and sleeve portion 15. These gussets are foldable along a line 23 and are purposely outwardly flared to hold the lens portion upright when the device is to be put into use.

Similar gussets 24 are provided between the parts 18 and 19 of the holder 16 whereby to hold the backing part 19 in its vertical position.

The album 21 consists of a series of picture pages or cards 25 hinged together by a spiral wire 26. Each of said cards 25 has two stereoscopic picture areas 27 and 28 thereon which are respectively observed by placing the device to the eyes of the user and so that the user may look through the lenses 12 and 13. The nose space 14 will properly locate the device and while holding the device with one hand, the other hand can be used to flip over the different picture cards 25 and to adjust the focus by moving or sliding part 18 relatively to sleeve 15 (see arrow A). The lens portions and the backing portion 19 are self-supporting and the user does not need to be concerned about accidental collapse of the device. The gussets 22 and 24 are flared outwardly so that the portions cannot fold down, unless said gussets are pushed inwardly by hand about folds 23. Fig. 3 shows the device in collapsed position.

The lens portion 11 is provided with a covering 29 which is extended onto the sleeve portion 15, as shown in Fig. 2, to provide a hinge 30 connecting the portion 11 with the sleeve portion 15.

In Fig. 4, there is shown another form of the invention wherein the holder for the picture album includes the cover page of the album which, as indicated at 31, is extended directly into sleeve portion 15. A special holder 32 having a gusset connection 33 with a portion 34 that slides onto another cover 35 of an album 36. The holder 32 will support the cover 35 of the album 36 and pages 37 thereof can be lowered to show the picture areas 38 and 39. The album 36 can be easily removed from the sleeve portion 15 and from the support 32, and replaced by another album. This stereoscopic device is particularly adapted for use on horizontal surfaces as it is by means of the holder 32 engaging with such surface that the album is held in an upright position.

Referring now particularly to Figs. 5 and 6, there is shown a form of the invention wherein the walls of a box are utilized for the supporting of the lenses and of the album. In this form of the invention, a box structure 41 is provided. This structure has a wall portion 42 for supporting lenses 43 and 44 and into this wall portion there is cut a nose space 45. This space extends into the bottom or base wall portion of the box structure 41. The wall portion of the box positioned opposite to the lens portion 42 is provided with a pocket 46 into which can be slid a cover sheet 47 of an album 48 whereby said cover sheet may extend beyond the upper edge defining pocket 46 as seen in Fig. 5 and retained in the pocket. Pages 49 having pictures are flipped over the top of the pocket 46 and cover sheet and into the interior of the container or box to present the pictures in abutting relation to said opposite wall portion. These pictures will be observed while the box is held to the eyes and supported upon the nose of the viewer. A container or top cover 51 will, through its white inner surface, cause light to be reflected onto the uppermost picture within the box 41. This cover has a flap 52 which extends into the pocket 46 for closing purposes when the albums are stored in the box, in the manner as shown in Fig. 6. Several of these albums can be stored in the box when the device is not being used.

Referring now particularly to Figs. 7, 8 and 9, there is shown a still further form of the invention wherein the album is a permanent part of the device. A lens portion 55 is hinged by a tape 56 to a base portion 57. This lens portion 55 has the usual lenses 58 and 59. Cut into the lens portion and into the base portion is a nose space 61.

Foldable upon the base portion at the rear thereof is a back support or wall portion 62 for a book 63 which is connected by suitable retaining means, such as a wire coil 64 to the side edge of the wall portion 62. This album or book 63 with picture pages 65 has a cover sheet 66 with a tab 67 thereon adapted to engage with a slot or recess 68 in the side edge of the lens portion 55 whereby to hold the lens portion 55 in an upright manner relative to the base portion 57. Also, the back supporting portion 62 will be held upright. Thereafter, with the device brought to the eyes of the viewer, pages 65 of the album can be turned about the vertical hinge wire coil 64 so that the different pages and the pictures thereon can be viewed in succession.

With the tab 67 detached from the slot 68, the album 63 can be closed and the portions folded upon one another, as shown in Fig. 9.

It should be apparent that there has been provided a simple stereoscopic device formed of inexpensive materials and wherein the different albums are attachable to the supporting portions of the device in such a manner that they can be turned to present different picture areas, and wherein the device can be folded when not in use to consume little space.

While various changes may be made in the detail construction, it shall be understood that such changes shall be within the spirit and scope of the present invention as defined by the appended claims.

Having thus described the invention, what is claimed as new and desired to be secured by Letters Patent, is:

1. A stereoscopic device comprising a box-like structure having opposite walls and a portion formed in one wall thereof for receiving lens means, another wall having a pocket opening therein for the insertion of a picture album therein having picture and cover sheets, said cover sheet being extendable into the pocket of the other wall for maintaining in position against said other wall so that the picture sheets thereof can be turned into the box structure for viewing from said lens means, said box-like structure having a cover with an inner surface serving when elevated to reflect light toward the picture sheets of the album being viewed, and a flap on said cover for insertion into said pocket to close said box-like structure upon prior removal of said picture album from said pocket.

2. A stereoscopic device comprising a box-like structure having spaced walls and a base portion between said walls, lenses provided in one of the walls, the other wall having a pocket therein, an album having a cover sheet and picture pages, said cover sheet of the album extending into the pocket whereby the picture pages can be turned inwardly into the box for viewing from the lenses, a cover on said box-like structure having a flap thereon, said album being removable from said pocket and adapted for storage within the box-like structure, said cover being adapted to be folded down over the stored album and with said flap for engagement with the pocket in the other wall of the box-like structure.

3. A stereoscopic device comprising a container having spaced apart walls and a base portion, lenses provided in one of the walls, the other wall having a pocket therein terminating in an edge, an album having a cover sheet and picture pages, said cover sheet of the album extending into the pocket whereby the picture pages can be turned about said edge of said pocket into the container for viewing said picture pages from the lenses, a container cover having a flap thereon, said album being removable from said pocket and adapted for storage within the container, the flap of said container cover being adapted to enter the pocket in the other wall for closing said container, and a nose opening cut in the lens wall and the base portion to receive the nose of the viewer holding said container.

THEODORE B. TINKER.

REFERENCES CITED

The following references are of record in the file of this patent:

UNITED STATES PATENTS

| Number | Name | Date |
|---|---|---|
| 61,359 | Rawson | Jan. 22, 1867 |
| 174,893 | Bierstadt | Mar. 21, 1876 |
| 962,643 | Knopping | June 28, 1910 |
| 984,055 | White | Feb. 14, 1911 |
| 1,850,153 | Paroselli | Mar. 22, 1932 |
| 2,005,027 | Ellsworth | June 18, 1935 |
| 2,133,222 | Zwald | Oct. 11, 1938 |
| 2,190,646 | Branson | Feb. 20, 1940 |
| 2,377,109 | Schwartz et al. | May 29, 1945 |

FOREIGN PATENTS

| Number | Country | Date |
|---|---|---|
| 344,421 | France | Sept. 3, 1904 |
| 173,849 | Great Britain | Jan. 5, 1922 |
| 266,869 | Great Britain | Mar. 10, 1927 |